US012569764B2

(12) United States Patent　　　　(10) Patent No.:　US 12,569,764 B2
　　　Keskin　　　　　　　　　　　　　(45) Date of Patent:　　Mar. 10, 2026

(54) INPUT ANALYSIS AND CONTENT ALTERATION

(71) Applicant: QUALCOMM Incorporated, San Diego, CA (US)

(72) Inventor: Mustafa Keskin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/188,117

(22) Filed: Mar. 22, 2023

(65) Prior Publication Data

US 2024/0316459 A1　　Sep. 26, 2024

(51) Int. Cl.
　　*A63F 13/5375*　　(2014.01)
　　*A63F 13/216*　　(2014.01)
　　*A63F 13/217*　　(2014.01)
　　*A63F 13/31*　　(2014.01)
　　*A63F 13/424*　　(2014.01)
　　*A63F 13/493*　　(2014.01)
　　*A63F 13/55*　　(2014.01)
　　*G06F 3/01*　　(2006.01)
　　*H04L 67/306*　　(2022.01)

(52) U.S. Cl.
　　CPC ............ *A63F 13/55* (2014.09); *A63F 13/216* (2014.09); *A63F 13/217* (2014.09); *A63F 13/424* (2014.09); *H04L 67/306* (2013.01); *A63F 2300/1081* (2013.01); *A63F 2300/205* (2013.01)

(58) Field of Classification Search
None
See application file for complete search history.

(56) References Cited

U.S. PATENT DOCUMENTS

| | | |
|---|---|---|
| 11,071,912 B2 | 7/2021 | Silverstein et al. |
| 2015/0268721 A1 | 9/2015 | Joo |
| 2018/0048595 A1* | 2/2018 | Dotan-Cohen ......... H04L 51/08 |
| 2018/0147483 A1* | 5/2018 | Osman ................ A63F 13/5258 |
| 2018/0256979 A1* | 9/2018 | Kunieda ................ A63F 13/47 |
| 2019/0064522 A1 | 2/2019 | Reif |
| 2021/0023453 A1 | 1/2021 | DeVico |
| 2022/0314114 A1 | 10/2022 | Kadota et al. |

FOREIGN PATENT DOCUMENTS

| | | |
|---|---|---|
| EP | 2098271 A2 | 9/2009 |
| WO | 2014197873 A2 | 12/2014 |
| WO | 2018165446 A1 | 9/2018 |

OTHER PUBLICATIONS

International Search Report and Written Opinion—PCT/US2024/013743—ISA/EPO—May 24, 2024.

* cited by examiner

*Primary Examiner* — Lawrence S Galka
(74) *Attorney, Agent, or Firm* — Harrity & Harrity LLP/Qualcomm Incorporated

(57) ABSTRACT

In some aspects, a user equipment (UE) may display content via a display associated with the UE. The UE may receive an input via a sensor associated with the UE while displaying the content. The UE may alter the content based at least in part on the input, wherein altering the content comprises introducing a character into the content or changing an environment or a difficulty of the content. Numerous other aspects are described.

30 Claims, 5 Drawing Sheets

100

300

Input Source 310

Input 305

Content Interruption 315

UE 120

510 Display content via a display associated with the UE

520 Receive an input via a sensor associated with the UE while displaying the content 530 Alter the content based at least in part on the input, wherein altering the content comprises introducing a character into the content or changing an environment or a difficulty of the content

500

INPUT ANALYSIS AND CONTENT ALTERATION

FIELD OF THE DISCLOSURE

Aspects of the present disclosure generally relate to content interaction and, for example, to input analysis and content alteration.

BACKGROUND

Wireless communication systems are widely deployed to provide various telecommunication services such as telephony, video, data, messaging, and broadcasts. Wireless communication systems may employ multiple-access technologies capable of supporting communication with multiple users by sharing available system resources (e.g., bandwidth, transmit power, or the like). A wireless network may include one or more network nodes that support communication, for example, between the network node and a user equipment (UE). A UE may be configured to display content, such as extended reality content, virtual reality content, augmented reality content, social media content, and/or gaming content, among other examples, to a user of the UE. In one example, the UE may be a headset or other device capable of displaying the content to the user. This may cause the user of the UE to become disconnected from reality, for example, since the user may only be able to see or hear what is occurring in the virtual environment.

SUMMARY

Some aspects described herein relate to a method of wireless communication performed by a user equipment (UE). The method may include displaying content via a display associated with the UE. The method may include receiving an input via a sensor associated with the UE while displaying the content. The method may include altering the content based at least in part on the input, wherein altering the content comprises introducing a character into the content or changing an environment or a difficulty of the content.

Some aspects described herein relate to an apparatus for wireless communication at a UE. The apparatus may include a memory and one or more processors coupled to the memory. The one or more processors may be configured to display content via a display associated with the UE. The one or more processors may be configured to receive an input via a sensor associated with the UE while displaying the content. The one or more processors may be configured to alter the content based at least in part on the input, wherein altering the content comprises introducing a character into the content or changing an environment or a difficulty of the content.

Some aspects described herein relate to a non-transitory computer-readable medium that stores a set of instructions for wireless communication by a UE. The set of instructions, when executed by one or more processors of the UE, may cause the UE to display content via a display associated with the UE. The set of instructions, when executed by one or more processors of the UE, may cause the UE to receive an input via a sensor associated with the UE while displaying the content. The set of instructions, when executed by one or more processors of the UE, may cause the UE to alter the content based at least in part on the input, wherein altering the content comprises introducing a character into the content or changing an environment or a difficulty of the content.

Some aspects described herein relate to an apparatus for wireless communication. The apparatus may include means for displaying content via a display associated with the apparatus. The apparatus may include means for receiving an input via a sensor associated with the apparatus while displaying the content. The apparatus may include means for altering the content based at least in part on the input, wherein altering the content comprises introducing a character into the content or changing an environment or a difficulty of the content.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
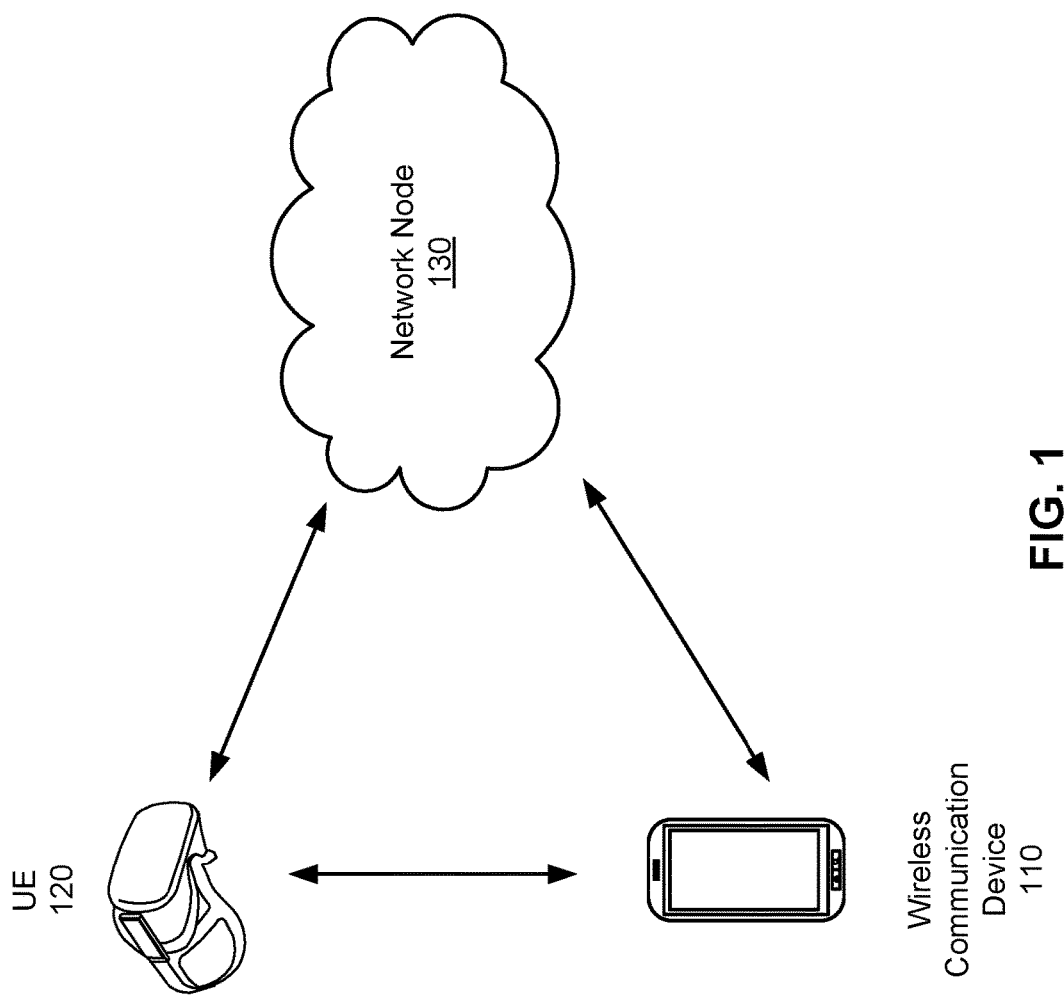
FIG. 1 is a diagram of an example environment in which systems and/or methods described herein may be implemented.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A user equipment (UE) may be, may include, or may be included in a headset, a cellular phone, a tablet, and/or a gaming device, among other examples. The UE may be configured to display content via a display associated with the UE. The display may be included in the UE or may be otherwise connected to the UE. In some cases, audio associated with the content may be played by an audio component associated with the UE. The audio component (e.g., headphones) may be included in the UE or may be otherwise connected to the UE. The content may be extended reality (XR) content, virtual reality (VR) content, augmented reality (AR) content, video content, gaming content, social media content, and/or communication content that causes the user of the UE to become disconnected from the surrounding environment. In some cases, an input may be received from an input source. The input may be received via a sensor associated with the UE. The input may be received via the sensor while the user of the UE is viewing or otherwise interacting with the content. In one example, the content may be video game content that is being displayed to a user by a VR headset. The input may be received via a microphone associated with the VR headset, and the input source may be a parent of the user instructing the user to "stop playing video games because dinner is ready." The input may result in content interruption. For example, the input may be played back to the user as audio via a speaker associated with the VR headset, such as via headphones having active noise cancelation features. This audio may override important audio associated with the video game. Additionally, or alternatively, the user may be at a point in the video game that cannot be paused or saved, and the user may need to abandon the video game prior to a natural resolution of the video game. Interrupting the content and causing the user to abandon the content earlier than expected may negatively impact the user experience.

Techniques and apparatuses are described herein for input analysis and content alteration. The UE may display content via a display associated with the UE. The UE may receive an input via the sensor associated with the UE. The input may be received while the UE is displaying the content. The UE may alter the content based at least in part on receiving the input. In some aspects, altering the content may include altering a character associated with the content. Altering the character associated with the content may include, for example, introducing a new character into the content, such as a non-playable character or a central processing unit controlled character. In some aspects, altering the content may include altering an environment associated with the content. Altering the environment associated with the content may include, for example, introducing an obstacle into the content. In some aspects, altering the content may include increasing a difficulty of the content. This may cause the content to be resolved or completed more quickly without an obvious interruption to the content. For example, introducing the character into the content, introducing the obstacle into the content, or increasing the difficulty of the content may cause the content to resolve more quickly without expressly interrupting the content and without negatively impacting the user experience. Additional details are described herein.

FIG. 1 is a diagram of an example environment 100 in which systems and/or methods described herein may be implemented. As shown in FIG. 1, the environment 100 may include a wireless communication device 110, a UE 120, and a network node 130. The wireless communication device 110 and the network node 130 may communicate. Additionally, or alternatively, the UE 120 and the network node 130 may communicate. In some cases, the UE 120 and the wireless communication device 110 may communicate directly. In some other cases, the UE 120 and the wireless communication device 110 may communicate via the network node 130.

In some cases, the wireless communication device 110 and the UE 120 may be included in a single device. For example, the UE 120 may be included in the wireless communication device 110, or the wireless communication device 110 may be included in the UE 120. In some other cases, the UE 120 and the wireless communication device 110 may be separate devices. For example, the wireless communication device 110 may receive content from the network node 130, and may transmit the content to the UE 120 to be displayed to a user of the UE 120. In some cases, the UE 120, or the device that includes the UE 120 and the wireless communication device 110, may be an XR device such as a VR device or an AR device.

A network, such as a network that includes the network node 130, may include one or more wired networks, one or more wireless networks, or a combination thereof. A wireless network may be or may include elements of a 3G network, a 4G network, a 5G (New Radio (NR)) network, a Long Term Evolution (LTE) network, and/or a 6G network, among other examples. In some aspects, the network node 130 may be a base station (a Node B, a gNB, and/or a 5G node B (NB), among other examples), a relay device, a network controller, an access point, a transmit receive point (TRP), an apparatus, a device, a computing system, one or more components of any of these, and/or another processing entity configured to perform one or more aspects of the techniques described herein. For example, the network node 130 may be an aggregated base station and/or one or more components of a disaggregated base station.

The UE 120 may be a stationary device or a mobile device. In some cases, the UE 120 may be a display device or may include a display device, such as a virtual reality headset or a screen associated with a cellular phone, a tablet, or a gaming device. The UE 120 may be, may include, or may be included in a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, a radar device, or any other suitable device that is configured to communicate via a wireless or wired medium.

The wireless communication device 110 may be a stationary device or a mobile device. In some cases, the wireless communication device 110 may communicate with the network node 130, for example, to receive content from the network node 130. Additionally, or alternatively, the wireless communication device 110 may communicate with the UE 120, for example, to transmit the content to the UE 120. In some cases, as described above, the UE 120 and the wireless communication device 110 may be a single device or may be included in a single device. The wireless communication device 110 may be, may include, or may be included in a cellular phone (e.g., a smart phone), a personal digital assistant (PDA), a wireless modem, a handheld device, a laptop computer, a cordless phone, a wireless local loop (WLL) station, a tablet, a camera, a gaming device, a netbook, a smartbook, an ultrabook, a medical device or equipment, biometric sensors/devices, an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some wireless communication devices may be considered machine-type communication (MTC) or evolved or enhanced machine-type communication (eMTC) UEs. MTC and eMTC wireless communication devices include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some wireless communication devices may be considered Internet-of-Things (IoT) devices, and/or may be implemented as NB-IoT (narrowband internet of things) devices. Some wireless communication devices may be considered a Customer Premises Equipment (CPE). The wireless communication device 110 may be included inside a housing that houses components of the wireless communication device 110, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

The number and arrangement of devices and components shown in FIG. 1 are provided as one or more examples. In practice, there may be additional devices and/or components, fewer devices and/or components, different devices and/or components, or differently arranged devices and/or components than those shown in FIG. 1. Furthermore, two or more devices and/or components shown in FIG. 1 may be implemented within a single device, or a single device and/or component shown in FIG. 1 may be implemented as multiple, distributed devices. Additionally, or alternatively, a set of devices and/or components (e.g., one or more devices and/or components) of environment 100 may perform one or more functions described as being performed by another set of devices and/or components of environment 100.

Figure 2:
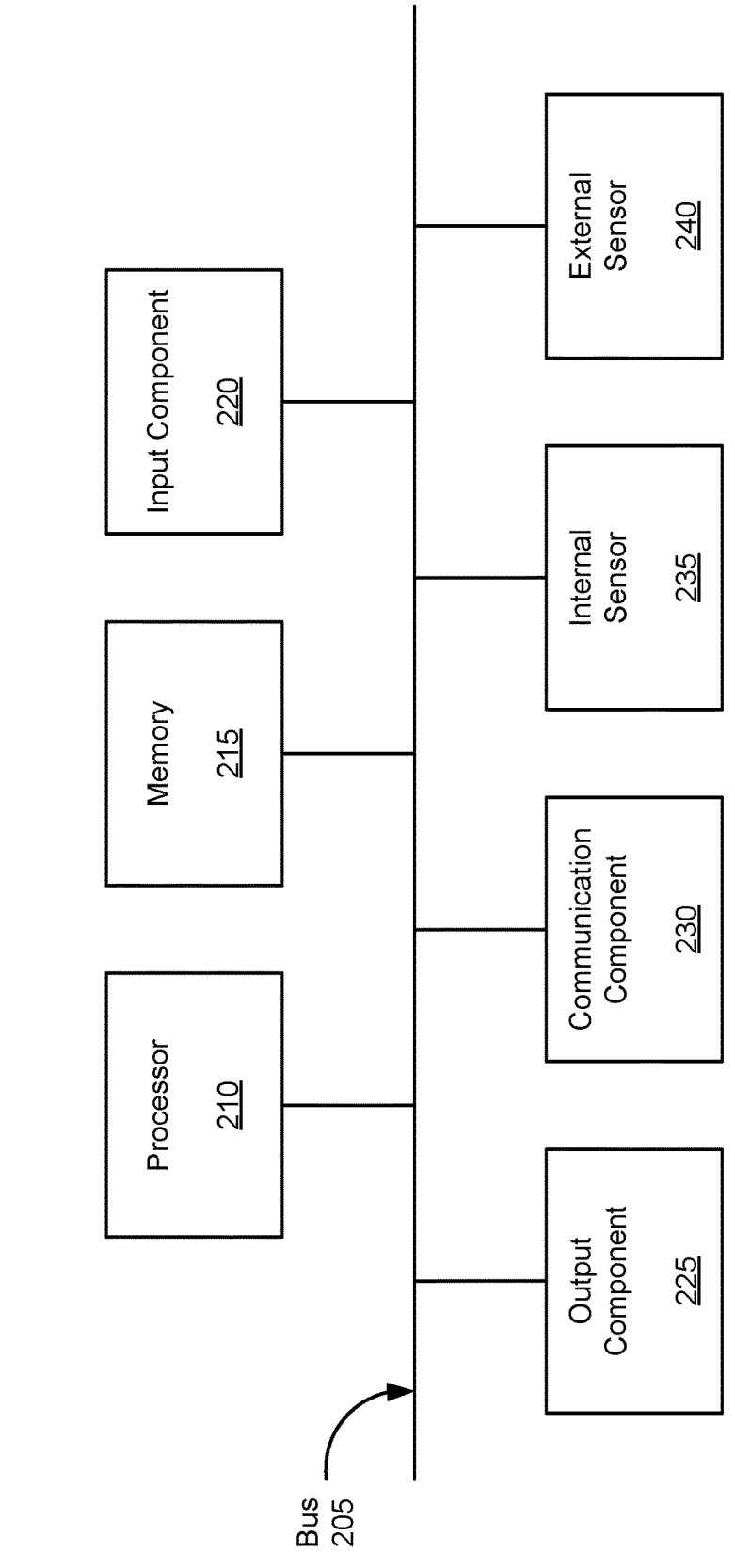
FIG. 2 is a diagram illustrating example components of a device, in accordance with the present disclosure.

FIG. 2 is a diagram illustrating example components of a device 200, in accordance with the present disclosure. The device 200 may correspond, for example, to the UE 120, the wireless communication device 110, or a device that includes the UE 120 and the wireless communication device 110. In some aspects, the UE 120, the wireless communication device 110, or the device that includes the UE 120 and the wireless communication device 110 may include one or more devices 200 and/or one or more components of the device 200. As shown in FIG. 2, the device 200 may include a bus 205, a processor 210, a memory 215, an input component 220, an output component 225, a communication component 230, an internal sensor 235 and/or an external sensor 240.

The bus 205 may include one or more components that enable wired and/or wireless communication among the components of the device 200. The bus 205 may couple together two or more components of FIG. 2, such as via operative coupling, communicative coupling, electronic coupling, and/or electric coupling. For example, the bus 205 may include an electrical connection (e.g., a wire, a trace, and/or a lead) and/or a wireless bus. The processor 210 may include a central processing unit, a graphics processing unit, a microprocessor, a controller, a microcontroller, a digital signal processor, a field-programmable gate array, an application-specific integrated circuit, and/or another type of processing component. The processor 210 may be implemented in hardware, firmware, or a combination of hardware and software. In some aspects, the processor 210 may include one or more processors capable of being programmed to perform one or more operations or processes described elsewhere herein.

The memory 215 may include volatile and/or nonvolatile memory. For example, the memory 215 may include random access memory (RAM), read only memory (ROM), a hard disk drive, and/or another type of memory (e.g., a flash memory, a magnetic memory, and/or an optical memory). The memory 215 may include internal memory (e.g., RAM, ROM, or a hard disk drive) and/or removable memory (e.g., removable via a universal serial bus connection). The memory 215 may be a non-transitory computer-readable medium. The memory 215 may store information, one or more instructions, and/or software (e.g., one or more software applications) related to the operation of the device 200. In some aspects, the memory 215 may include one or more memories that are coupled (e.g., communicatively coupled) to one or more processors (e.g., processor 210), such as via the bus 205. Communicative coupling between a processor 210 and a memory 215 may enable the processor 210 to read and/or process information stored in the memory 215 and/or to store information in the memory 215.

The input component 220 may enable the device 200 to receive an input from a user of the device 200. For example, the input component 220 may include a touch screen, a keyboard, a keypad, a mouse, a button, a microphone, and/or a switch, among other examples. The output component 225 may enable the device 200 to provide output, such as via a display, a speaker, and/or a light-emitting diode. The communication component 230 may enable the device 200 to communicate with other devices via a wired connection and/or a wireless connection. For example, the communication component 230 may include a receiver, a transmitter, a transceiver, a modem, a network interface card, and/or an antenna.

The internal sensor 235 may be a sensor that is included in the device 200. For example, the internal sensor 235 may be located in the device 200 or on the device 200. The internal sensor 235 may be an audio sensor (such as a microphone), a temperature sensor, a battery sensor, a time sensor, and/or a data sensor, among other examples. The internal sensor 235 may be configured to receive or detect an input that is not associated with the user of the device 200. For example, the internal sensor 235 may be configured to receive an audio input, such as a human voice that is not a voice associated with the user of the device 200. Additionally, or alternatively, the internal sensor 235 may be configured to detect a temperature of the device 200, a battery level of the device 200, or a time indicated by the device 200, among other examples.

The external sensor 240 may be a sensor that is not included in the device 200. For example, the external sensor 240 may be located in another device or on another device that is connected to the device 200. The other device that includes the external sensor 240 may be connected to the device 200 using a wired connection or a wireless connection. The external sensor 240 may be, for example, an audio sensor or a data sensor, among other examples. In one example, the external sensor 240 may be associated with a headset that is connected to the device 200.

The device 200 may perform one or more operations or processes described herein. For example, a non-transitory computer-readable medium (e.g., memory 215) may store a set of instructions (e.g., one or more instructions or code) for execution by the processor 210. The processor 210 may execute the set of instructions to perform one or more operations or processes described herein. In some aspects, execution of the set of instructions, by one or more processors 210, causes the one or more processors 210 and/or the device 200 to perform one or more operations or processes described herein. In some aspects, hardwired circuitry may be used instead of or in combination with the instructions to perform one or more operations or processes described herein. Additionally, or alternatively, the processor 210 may be configured to perform one or more operations or processes described herein. Thus, aspects described herein are not limited to any specific combination of hardware circuitry and software.

In some aspects, device 200 may include means for displaying content via a display associated with the UE; means for receiving an input via a sensor associated with the UE while displaying the content; and/or means for altering the content based at least in part on the input, wherein altering the content comprises introducing a character into the content or changing an environment or a difficulty of the content. In some aspects, the means for device 200 to perform processes and/or operations described herein may include one or more components of device 200 described in connection with FIG. 2, such as bus 205, processor 210, memory 215, input component 220, output component 225, communication component 230, internal sensor 235, and/or external sensor 240.

The number and arrangement of components shown in FIG. 2 are provided as an example. The device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
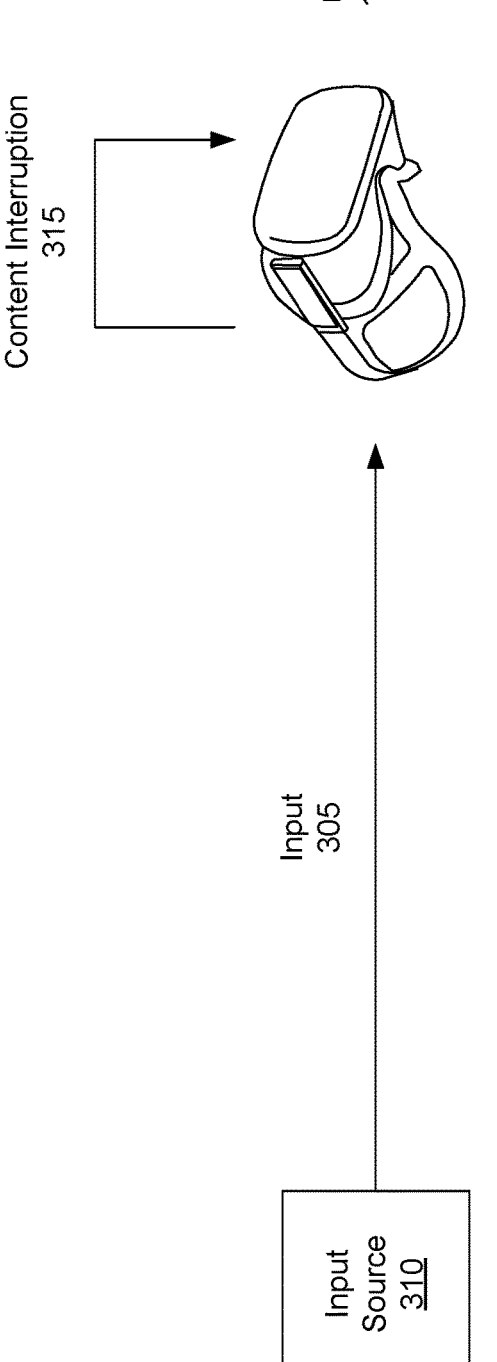
FIG. 3 is a diagram illustrating an example of content interruption, in accordance with the present disclosure.

FIG. 3 is a diagram illustrating an example 300 of content interruption, in accordance with the present disclosure.

Content may be displayed by the UE 120. The UE 120 may be, may include, or may be included in a headset, a cellular phone, a tablet, and/or a gaming device. In some cases, the content may be displayed via a display associated with the UE 120. The display may be included in the UE 120 or may be otherwise connected to the UE 120. In some cases, audio associated with the content may be played by an audio component of the UE 120. The audio component may be included in the UE 120 or may be otherwise connected to the UE 120. For example, the audio component may include headphones. The content may be XR content, VR content, AR content, video content, gaming content, social media content, and/or communication content. The content may cause a user of the UE 120 to become disconnected from the surrounding environment. In some cases, an input 305 may be received from an input source 310. The input may be received via a sensor associated with the UE 120, such as the internal sensor 235 or the external sensor 240. The input 305 may be received via the sensor while the user of the UE 120 is viewing or otherwise interacting with the content. In one example, the content may be video game content that is being displayed to the user by a VR headset. The input 305 may be received via a microphone associated with the VR headset and the input source 310 may be a parent of the user. The input 305 may result in content interruption 315 at the UE 120. For example, the input 305 may be played back to the user as audio via a speaker associated with the VR headset, such as via headphones having active noise cancelation features. This audio may override important audio associated with the video game. Additionally, or alternatively, the user may be at a point in the video game that cannot be paused or saved, and the user may need to abandon the video game prior to a natural resolution of the video game. Interrupting the content and causing the user to abandon the content earlier than expected may negatively impact the user experience.

Techniques and apparatuses are described herein for input analysis and content alteration. A UE may display content via a display associated with the UE. The UE may receive an input via a sensor associated with the UE. The input may be received while the UE is displaying the content. The UE may alter the content based at least in part on receiving the input. In some aspects, altering the content may include altering a character associated with the content. Altering the character associated with the content may include, for example, introducing a new character into the content, such as a non-playable character or a central processing unit controlled character. In some aspects, altering the content may include altering an environment associated with the content. Altering the environment associated with the content may include, for example, introducing an obstacle into the content. In some aspects, altering the content may include increasing a difficulty of the content. This may cause the content to be resolved or completed more quickly without an obvious interruption to the content. For example, introducing the character into the content, introducing the obstacle into the content, or increasing the difficulty of the content may cause the content to resolve more quickly without expressly interrupting the content and without negatively impacting the user experience. Additional details are described herein.

As indicated above, FIG. 3 is provided as an example. Other examples may differ from what is described with regard to FIG. 3.

Figure 4:
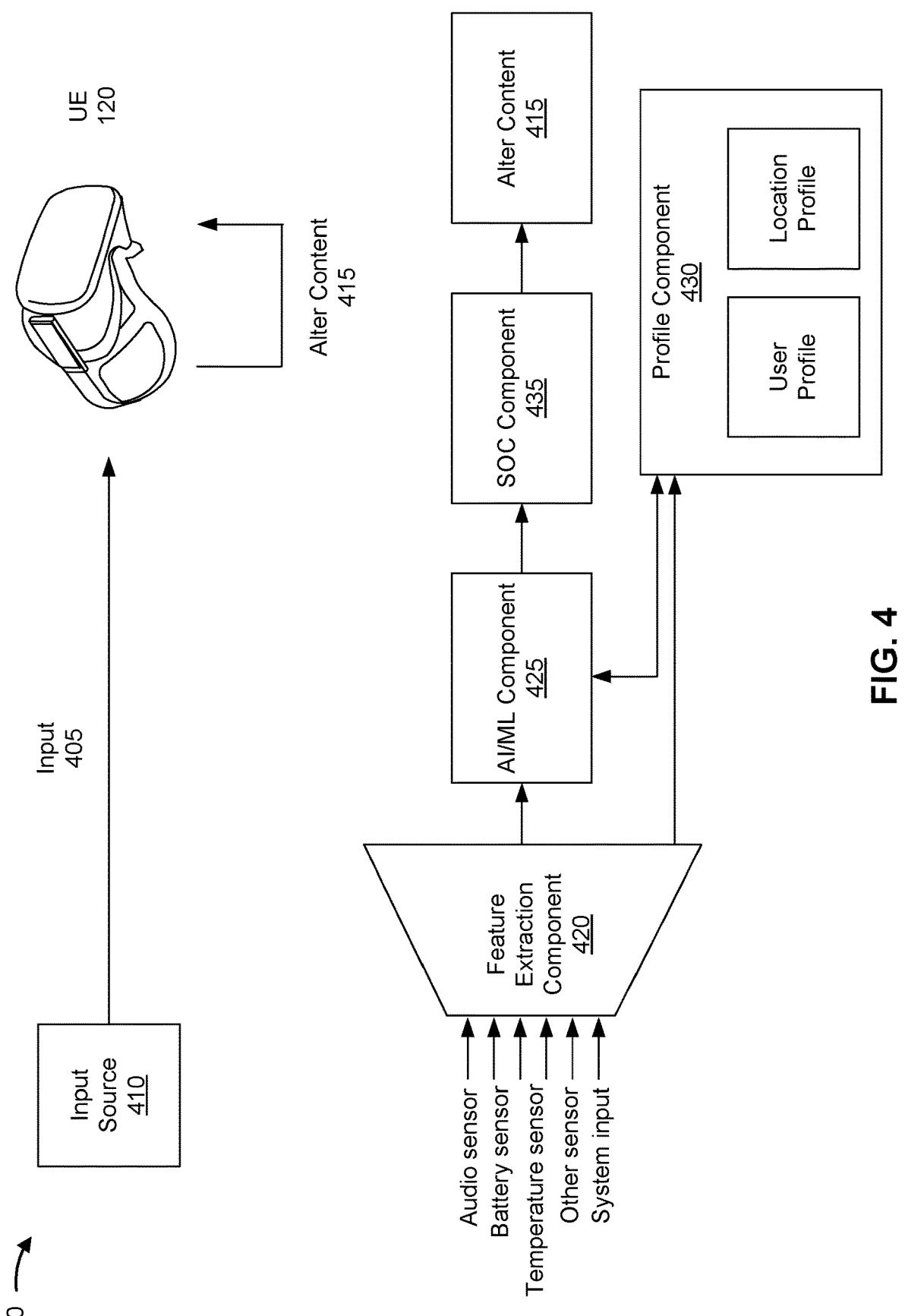
FIG. 4 is a diagram illustrating an example of input analysis and content alteration, in accordance with the present disclosure.

FIG. 4 is a diagram illustrating an example 400 of input analysis and content alteration, in accordance with the present disclosure.

The UE 120 may display content to a user of the UE 120. The content may be XR content, VR content, AR content, video content, gaming content, social media content, and/or communication content, among other examples. The UE 120 may display the content to the user of the UE 120 via a display associated with the UE 120. Additionally, the UE 120 may play audio associated with the content to the user of the UE 120 via an audio component associated with the UE 120. The audio component may be, for example, headphones that include active noise cancelation features. The UE 120 may receive an input 405 from an input source 410. The UE 120 may receive the input 405 via a sensor associated with the UE 120, such as the internal sensor 235 or the external sensor 240. The sensor may be, for example, an audio sensor, a temperature sensor, a battery sensor, a time sensor, and/or a data sensor, among other examples. In some aspects, the input 405 may include an audio input and the sensor may be a microphone. The input 405 may be an input that is not associated with the user of the UE 120. In one example, the input 405 may be a voice of another person, such as a voice of a parent of the user of the UE 120. In another example, the input 405 may include audio associated with another device, such as an audio device that is wirelessly connected to the UE 120. In some aspects, the input 405 may include a temperature input, and the sensor may be a temperature sensor. For example, the temperature sensor may detect that a temperature of the UE 120 is approaching a temperature threshold or has exceeded the temperature threshold. In some aspects, the input 405 may be a battery input, and the sensor may be a battery sensor. For example, the battery sensor may detect that a battery level of the UE 120 is approaching a low battery threshold or is below the low battery threshold. In some aspects, the input 405 may be a time input, and the sensor may be a time sensor. For example, the time sensor may detect that a current time is approaching a time threshold or has exceeded the time threshold. In some aspects, the input 405 may be a data input, and the sensor may be a data sensor. For example, the data sensor may receive data from another device, such as the wireless communication device 110, that is not related to the content. As shown by reference number 415, the UE 120 may alter the content based at least in part on the input 405 received from the input source 410.

In some aspects, altering the content may include altering a character associated with the content. Altering the character associated with the content may include, for example, introducing a new character into the content, such as a non-playable character (NPC) or a central processing unit controlled character (CPUC). In one example, the UE 120 may be a VR headset configured to display video game content, the input 405 may be received via a microphone associated with the VR headset while the VR headset is displaying the video game content, and the input source 410 may be a parent of the user instructing the user to "stop playing video games because dinner is ready." The UE 120 may alter the content, based at least in part on receiving the input 405, by introducing an NPC into the video game. The NPC may be a difficult opponent character that causes the user to lose the video game more quickly.

In some aspects, altering the content may include altering an environment associated with the content. In the example where the UE 120 is the VR headset, the UE 120 may detect that a temperature of the VR headset is approaching a temperature threshold. The UE 120 may alter the environment of the content such that the video game ends prior to the VR headset reaching or exceeding the temperature threshold. In one example, the video game may be a baseball video game, and the UE 120 may alter the environment associated with the content by changing the weather from sunny weather to rainy weather, thereby resulting in a rain delay. The video game may be resumed, and the environment may be changed back to sunny weather, when the temperature of the VR headset falls below the temperature threshold or another temperature threshold. In another example, altering the environment associated with the content may include introducing an obstacle into the environment. For example, the video game may be a motorcycle driving video game, and the environment may be altered such that the road surface becomes uneven and the motorcycle experiences a flat tire.

In some aspects, altering the content may include increasing a difficulty of the content. For example, the video game may be a boxing video game that the user is playing on a medium difficulty. Increasing the difficulty of the content may include changing the difficulty of the boxing video game from medium to hard. For example, the opponent character may be given greater strength or greater speed such that the user loses to the opponent character more quickly.

In some aspects, a feature extraction component 420, an artificial intelligence (AI) and/or machine learning (ML) (collectively, AI/ML) component 425, a profile 430, and/or a system-on-chip (SOC) component 435 may be used to determine an alteration to be applied to the content. Some or all of these components may be included in the UE 120. For example, some or all of the features configured to be performed by these components may be performed by the UE 120. Additionally, or alternatively, some or all of these components may be included in another device, such as a cloud computing device. For example, some or all of the features configured to be performed by these components may be performed by the cloud computing device. In one example, the feature extraction component 420, the AI/ML component 425, and the profile 430 may be included in the UE 120, and the SOC component 435 may be included in the other device. The feature extraction component 420, the AI/ML component 425, the profile 430, and the SOC component 435 are provided as example components. Other components, and/or a subset of these components, may be used for determining the alteration to be applied to the content.

The feature extraction component 420 may be configured to extract one or more features associated with the input 405. The feature extraction component 420 may be configured to receive an input, for example, from the audio sensor, the battery sensor, the temperature sensor, another sensor, and/or a system input. The system input may include, for example, a time that is indicated by a clock associated with the UE 120. The feature extraction component 420 may extract one or more features and may output the features, for example, to the AI/ML component 425.

The AI/ML component 425 may be configured to determine a context of the input, a source of the input, a sentiment of the input, and/or a strength of the input, among other examples. The context of the input may include, for example, information associated with other inputs that precede the input or follow the input. The source of the input may include information associated with the source 410. For example, the source of the input may be a human voice, such as a parent or a sibling associated with the user of the UE 120, or may be audio associated with a device that is in the same environment as the UE 120. The sentiment of the input may include one or more emotions associated with the input. For example, the sentiment may indicate whether the input is phrased as a command or a question. The strength of the input may indicate whether the input requires immediate attention or delayed attention.

In some aspects, the AI/ML component 425 may determine a priority for the input. The AI/ML component 425 may assign a priority to the input based at least in part on the context of the input, the source of the input, the sentiment of the input, and/or the strength of the input, among other examples. For example, the AI/ML component 425 may assign a high priority to a parental voice, a command, or an input that requires immediate attention (such as the device reaching a critical temperature threshold) but may assign a low priority to a sibling voice, a question, or an input that does not require immediate attention (such as a prompt indicating one hour of battery life remaining). The priority may be associated with a timeline for altering the content. For example, a high priority may indicate that the content is to be altered within ten seconds, whereas a low priority may indicate that the content is to be altered within ten minutes.

In some aspects, the AI/ML component 425 may analyze the context of the input, the source of the input, the sentiment of the input, or the strength of the input, and/or may determine the priority of the input, based at least in part on a profile 430. The profile 430 may enable the AI/ML component 425 to analyze the input with increased accuracy. The profile 430 may include, for example, a user profile and a location profile. The user profile may include information associated with the user of the UE 120. For example, the user profile may include data indicating that the user has two parents and a sister. The location profile may include information associated with one or more locations, such as one or more locations that are frequently visited by the user. For example, the location profile may indicate a location of a home or a school of the user, where commands are to be taken more seriously, and a location of a playground that the user visits, where commands may be taken less seriously. In another example, the location profile may indicate whether the user is at an airport or is at home. In this example, an announcement that includes flight information may be considered an important input when the user is at the airport, but may be considered an unimportant input when the user is at home (for example, if the flight information is associated with a television show being watched by the user). The AI/ML component 425 may output the analysis performed by the AI/ML component 425, for example, to the SOC component 435.

The SOC component 435 may determine an alteration to be applied to the content based at least in part on the analysis performed by the AI/ML component 425. For example, based at least in part on receiving an indication that the input is a command, the source is a parent of the user, and the priority is high, the SOC component 435 may introduce a first character into the video game or may change an environment of the video game to a first environment that significantly speeds up the video game. For example, the first character may have a first functionality, a first strength, a first speed, or a first power that makes the game more difficult, thereby causing the user to lose the game more quickly. In another example, based at least in part on receiving an indication that the input is a question, the source is a sibling, and the priority is low, the SOC component 435 may introduce a second character into the video game or change the environment to a second environment that only slightly speeds up the video game. For example, the second character may have a second functionality, a second strength, a second speed, or a second power that makes the game only slightly more difficult. In another example, the SOC component 435 may determine not to introduce the character or change the environment based at least in part on the input having very low priority.

As described herein, the UE 120 may alter content based at least in part on receiving an input. In some aspects, altering the content may include altering a character associated with the content, altering an environment associated with the content, or increasing a difficulty of the content. This may cause the content to be resolved or completed more quickly without an obvious interruption to the content. For example, introducing a character into the content, introducing an obstacle into the content, or increasing a difficulty of the content may cause the content to resolve more quickly without expressly interrupting the content and without negatively impacting the user experience.

As indicated above, FIG. 4 is provided as an example. Other examples may differ from what is described with regard to FIG. 4.

Figure 5:
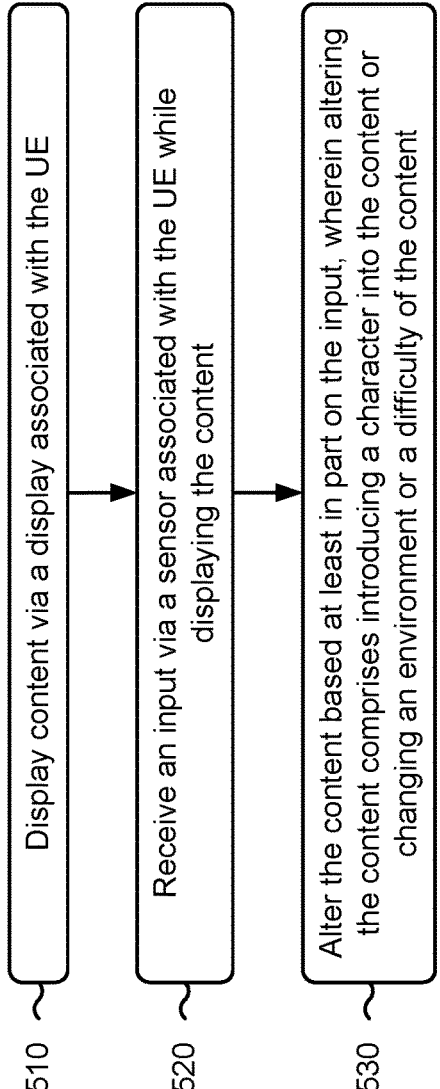
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120) performs operations associated with input analysis and content alteration.

As shown in FIG. 5, in some aspects, process 500 may include displaying content via a display associated with the UE (block 510). For example, the UE may display content via a display associated with the UE, as described above.

As further shown in FIG. 5, in some aspects, process 500 may include receiving an input via a sensor associated with the UE while displaying the content (block 520). For example, the UE may receive an input via a sensor associated with the UE while displaying the content, as described above.

As further shown in FIG. 5, in some aspects, process 500 may include altering the content based at least in part on the input, wherein altering the content comprises introducing a character into the content or changing an environment or a difficulty of the content (block 530). For example, the UE may alter the content based at least in part on the input, wherein altering the content comprises introducing a character into the content or changing an environment or a difficulty of the content, as described above.

Process 500 may include additional aspects, such as any single aspect or any combination of aspects described below and/or in connection with one or more other processes described elsewhere herein.

In a first aspect, process 500 includes performing an analysis of the input based at least in part on a context of the input, a source of the input, a sentiment of the input, or a strength of the input.

In a second aspect, alone or in combination with the first aspect, the analysis is performed based at least in part on a user profile or a location profile associated with a user of the UE.

In a third aspect, alone or in combination with one or more of the first and second aspects, process 500 includes determining a priority for the input based at least in part on the context of the input, the source of the input, the sentiment of the input, the strength of the input, or a time of the input.

In a fourth aspect, alone or in combination with one or more of the first through third aspects, process 500 includes determining an alteration to be applied to the content based at least in part on the priority and at least one of the context of the input, the source of the input, the sentiment of the input, the strength of the input, or the time of the input.

In a fifth aspect, alone or in combination with one or more of the first through fourth aspects, determining the alteration to be applied to the content comprises determining a level of alteration or an amount of alteration to be applied to the content.

In a sixth aspect, alone or in combination with one or more of the first through fifth aspects, process 500 includes performing, by an artificial intelligence and machine learning component, an analysis of the input based at least in part on a context of the input, a source of the input, a sentiment of the input, or a strength of the input; determining, by the artificial intelligence and machine learning component, a priority for the input based at least in part on the analysis of the input; and determining, by a system on chip component, an alteration to be applied to the content based at least in part on the priority for the input and at least one of the context of the input, the source of the input, the sentiment of the input, or the strength of the input.

In a seventh aspect, alone or in combination with one or more of the first through sixth aspects, the sensor is a microphone associated with the UE.

In an eighth aspect, alone or in combination with one or more of the first through seventh aspects, the input is a voice from a person that is not currently using the UE.

In a ninth aspect, alone or in combination with one or more of the first through eighth aspects, the input is an announcement from a device that is connected to the UE.

In a tenth aspect, alone or in combination with one or more of the first through ninth aspects, the input includes at least one of sensor data, a time condition, a temperature condition, or a battery condition.

In an eleventh aspect, alone or in combination with one or more of the first through tenth aspects, altering the content further comprises altering an existing character associated with the content.

In a twelfth aspect, alone or in combination with one or more of the first through eleventh aspects, the character is a non-playable character, a central processing unit controlled character, or a combination of the non-playable character and the central processing unit controlled character.

In a thirteenth aspect, alone or in combination with one or more of the first through twelfth aspects, process 500 includes determining a type of the character, a functionality of the character, a strength of the character, a speed of the character, or a power of the character.

In a fourteenth aspect, alone or in combination with one or more of the first through thirteenth aspects, altering the environment of the content comprises changing the environment of the content from a first environment to a second environment.

In a fifteenth aspect, alone or in combination with one or more of the first through fourteenth aspects, altering the environment of the content comprises introducing an obstacle into the environment of the content.

In a sixteenth aspect, alone or in combination with one or more of the first through fifteenth aspects, altering the difficulty of the content comprises increasing the difficulty of the content.

In a seventeenth aspect, alone or in combination with one or more of the first through sixteenth aspects, the UE is an extended reality device, a virtual reality device, or an augmented reality device.

In an eighteenth aspect, alone or in combination with one or more of the first through seventeenth aspects, the content is video game content.

In a nineteenth aspect, alone or in combination with one or more of the first through eighteenth aspects, the UE includes a plurality of sensors, and receiving the input comprises receiving a first input via a first sensor of the plurality of sensors and receiving a second input via a second sensor of the plurality of sensors.

In a twentieth aspect, alone or in combination with one or more of the first through nineteenth aspects, the input is not related to the content.

In a twenty-first aspect, alone or in combination with one or more of the first through twentieth aspects, process 500 includes playing audio associated with the content.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a user equipment (UE), comprising: displaying content via a display associated with the UE; receiving an input via a sensor associated with the UE while displaying the content; and altering the content based at least in part on the input, wherein altering the content comprises introducing a character into the content or changing an environment or a difficulty of the content.

Aspect 2: The method of Aspect 1, further comprising performing an analysis of the input based at least in part on a context of the input, a source of the input, a sentiment of the input, or a strength of the input.

Aspect 3: The method of Aspect 2, wherein the analysis is performed based at least in part on a user profile or a location profile associated with a user of the UE.

Aspect 4: The method of Aspect 2, further comprising determining a priority for the input based at least in part on the context of the input, the source of the input, the sentiment of the input, the strength of the input, or a time of the input.

Aspect 5: The method of Aspect 4, further comprising determining an alteration to be applied to the content based at least in part on the priority and at least one of the context of the input, the source of the input, the sentiment of the input, the strength of the input, or the time of the input.

Aspect 6: The method of Aspect 5, wherein determining the alteration to be applied to the content comprises determining a level of alteration or an amount of alteration to be applied to the content.

Aspect 7: The method of any of Aspects 1-6, further comprising: performing, by an artificial intelligence and machine learning component, an analysis of the input based at least in part on a context of the input, a source of the input, a sentiment of the input, or a strength of the input; determining, by the artificial intelligence and machine learning component, a priority for the input based at least in part on the analysis of the input; and determining, by a system on chip component, an alteration to be applied to the content based at least in part on the priority for the input and at least one of the context of the input, the source of the input, the sentiment of the input, or the strength of the input.

Aspect 8: The method of any of Aspects 1-7, wherein the sensor is a microphone associated with the UE.

Aspect 9: The method of Aspect 8, wherein the input is a voice from a person that is not currently using the UE.

Aspect 10: The method of Aspect 8, wherein the input is an announcement from a device that is connected to the UE.

Aspect 11: The method of any of Aspects 1-10, wherein the input includes at least one of sensor data, a time condition, a temperature condition, or a battery condition.

Aspect 12: The method of any of Aspects 1-11, wherein altering the content further comprises altering an existing character associated with the content.

Aspect 13: The method of any of Aspects 1-12, wherein the character is a non-playable character, a central processing unit controlled character, or a combination of the non-playable character and the central processing unit controlled character.

Aspect 14: The method of any of Aspects 1-13, further comprising determining a type of the character, a functionality of the character, a strength of the character, a speed of the character, or a power of the character.

Aspect 15: The method of any of Aspects 1-14, wherein altering the environment of the content comprises changing the environment of the content from a first environment to a second environment.

Aspect 16: The method of any of Aspects 1-15, wherein altering the environment of the content comprises introducing an obstacle into the environment of the content.

Aspect 17: The method of any of Aspects 1-16, wherein altering the difficulty of the content comprises increasing the difficulty of the content.

Aspect 18: The method of any of Aspects 1-17, wherein the UE is an extended reality device, a virtual reality device, or an augmented reality device.

Aspect 19: The method of any of Aspects 1-18, wherein the content is video game content.

Aspect 20: The method of any of Aspects 1-19, wherein the UE includes a plurality of sensors, and wherein receiving the input comprises receiving a first input via a first sensor of the plurality of sensors and receiving a second input via a second sensor of the plurality of sensors.

Aspect 21: The method of any of Aspects 1-20, wherein the input is not related to the content.

Aspect 22: The method of any of Aspects 1-21, further comprising playing audio associated with the content.

Aspect 23: An apparatus for wireless communication at a user equipment (UE), comprising: a memory; and one or more processors, coupled to the memory, configured to: display content via a display associated with the UE; receive an input via a sensor associated with the UE while displaying the content; and alter the content based at least in part on the input, wherein altering the content comprises introducing a character into the content or changing an environment or a difficulty of the content.

Aspect 24: A non-transitory computer-readable medium storing a set of instructions for wireless communication, the set of instructions comprising: one or more instructions that, when executed by one or more processors of a user equipment (UE), cause the UE to: display content via a display associated with the UE; receive an input via a sensor associated with the UE while displaying the content; and alter the content based at least in part on the input, wherein altering the content comprises introducing a character into the content or changing an environment or a difficulty of the content.

Aspect 25: An apparatus for wireless communication, comprising: means for displaying content via a display associated with the apparatus; means for receiving an input via a sensor associated with the apparatus while displaying the content; and means for altering the content based at least in part on the input, wherein altering the content comprises introducing a character into the content or changing an environment or a difficulty of the content.

Aspect 26: A system configured to perform one or more operations recited in one or more of Aspects 1-25.

Aspect 27: An apparatus comprising means for performing one or more operations recited in one or more of Aspects 1-25.

Aspect 28: A non-transitory computer-readable medium storing a set of instructions, the set of instructions comprising one or more instructions that, when executed by a device, cause the device to perform one or more operations recited in one or more of Aspects 1-25.

Aspect 29: A computer program product comprising instructions or code for executing one or more operations recited in one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   displaying content via a display associated with the UE;
   receiving an input via a sensor associated with the UE while displaying the content, wherein a priority of the input is determined based at least in part on a location profile, the location profile indicating a first location where inputs are associated with a first priority and a second location where the inputs are associated with a second priority; and
   altering the content based at least in part on the input, wherein altering the content comprises introducing a character into the content or changing an environment or a difficulty of the content.

2. The method of claim 1, further comprising:
   performing an analysis of the input based at least in part on a context of the input, a source of the input, a sentiment of the input, or a strength of the input.

3. The method of claim 2, wherein the analysis is performed based at least in part on a user profile or the location profile, and wherein the location profile is associated with a user of the UE.

4. The method of claim 2, further comprising:
   determining the priority of the input based at least in part on the context of the input, the source of the input, the sentiment of the input, the strength of the input, or a time of the input.

5. The method of claim 4, further comprising:
   determining an alteration to be applied to the content based at least in part on the priority and at least one of the context of the input, the source of the input, the sentiment of the input, the strength of the input, or the time of the input.

6. The method of claim 5, wherein determining the alteration to be applied to the content comprises determining a level of the alteration or an amount of the alteration to be applied to the content.

7. The method of claim 1, further comprising:
   performing, by an artificial intelligence and machine learning component, an analysis of the input based at least in part on a context of the input, a source of the input, a sentiment of the input, or a strength of the input;
   determining, by the artificial intelligence and machine learning component, the priority of the input based at least in part on the analysis of the input; and
   determining, by a system on chip component, an alteration to be applied to the content based at least in part on the priority of the input and at least one of the context of the input, the source of the input, the sentiment of the input, or the strength of the input.

8. The method of claim 1, wherein the sensor is a microphone associated with the UE.

9. The method of claim 8, wherein the input is a voice from a person that is not currently using the UE.

10. The method of claim 8, wherein the input is an announcement from a device that is connected to the UE.

11. The method of claim 1, wherein the input includes at least one of sensor data, a time condition, a temperature condition, or a battery condition.

12. The method of claim 1, wherein altering the content further comprises altering an existing character associated with the content.

13. The method of claim 1, wherein the character is a non-playable character, a central processing unit controlled character, or a combination of the non-playable character and the central processing unit controlled character.

14. The method of claim 1, further comprising:
   determining a type of the character, a functionality of the character, a strength of the character, a speed of the character, or a power of the character.

15. The method of claim 1, wherein altering the environment of the content comprises changing the environment of the content from a first environment to a second environment.

16. The method of claim 1, wherein altering the environment of the content comprises introducing an obstacle into the environment of the content.

17. The method of claim 1, wherein altering the difficulty of the content comprises increasing the difficulty of the content.

18. The method of claim 1, wherein the UE is an extended reality device, a virtual reality device, or an augmented reality device.

19. The method of claim 1, wherein the content is video game content.

20. The method of claim 1, wherein the UE includes a plurality of sensors, and wherein receiving the input comprises receiving a first input via a first sensor of the plurality of sensors and receiving a second input via a second sensor of the plurality of sensors.

21. The method of claim 1, wherein the input is not related to the content.

22. The method of claim 1, further comprising:
   playing audio associated with the content.

23. An apparatus for wireless communication at a user equipment (UE), comprising:
   a memory; and
   one or more processors, coupled to the memory, configured to:
      display content via a display associated with the UE;
      receive an input via a sensor associated with the UE while displaying the content, wherein a priority of the input is determined based at least in part on a location profile, the location profile indicating a first location where inputs are associated with a first priority and a second location where the inputs are associated with a second priority; and
      alter the content based at least in part on the input, wherein altering the content comprises introducing a character into the content or changing an environment or a difficulty of the content.

24. The apparatus of claim 23, wherein the one or more processors are further configured to perform an analysis of the input based at least in part on a context of the input, a source of the input, a sentiment of the input, or a strength of the input.

25. The apparatus of claim 24, wherein the analysis is performed based at least in part on a user profile or the location profile, and wherein the location profile is associated with a user of the UE.

26. The apparatus of claim 24, wherein the one or more processors are further configured to determine the priority of the input based at least in part on the context of the input, the source of the input, the sentiment of the input, the strength of the input, or a time of the input.

27. The apparatus of claim 26, wherein the one or more processors are further configured to determine an alteration to be applied to the content based at least in part on the priority of the input and at least one of the context of the input, the source of the input, the sentiment of the input, the strength of the input, or the time of the input.

28. The apparatus of claim 23, wherein the input includes at least one of sensor data, a time condition, a temperature condition, or a battery condition.

29. A non-transitory computer-readable medium storing a set of instructions for wireless communication, the set of instructions comprising:

one or more instructions that, when executed by one or more processors of a user equipment (UE), cause the UE to:

display content via a display associated with the UE;

receive an input via a sensor associated with the UE while displaying the content, wherein a priority of the input is determined based at least in part on a location profile, the location profile indicating a first location where inputs are associated with a first priority and a second location where the inputs are associated with a second priority; and alter the content based at least in part on the input, wherein altering the content comprises introducing a character into the content or changing an environment or a difficulty of the content.

30. An apparatus for wireless communication, comprising:

means for displaying content via a display associated with the apparatus;

means for receiving an input via a sensor associated with the apparatus while displaying the content, wherein a priority of the input is determined based at least in part on a location profile, the location profile indicating a first location where inputs are associated with a first priority and a second location where the inputs are associated with a second priority; and means for altering the content based at least in part on the input, wherein altering the content comprises introducing a character into the content or changing an environment or a difficulty of the content.

\* \* \* \* \*